(12) United States Patent
Shaikh et al.

(10) Patent No.: US 10,578,163 B2
(45) Date of Patent: Mar. 3, 2020

(54) COMPENSATING BEARING SEALS

(71) Applicant: SCHAEFFLER TECHNOLOGIES AG & CO. KG, Herzogenaurach (DE)

(72) Inventors: Shakeel Shaikh, Windsor (CA); Renato de Paula, Sterling Heights, MI (US)

(73) Assignee: SCHAEFFLER TECHNOLOGIES AG & CO. KG, Herzogenaurach (DE)

(*) Notice: Subject to any disclaimer, the term of this patent is extended or adjusted under 35 U.S.C. 154(b) by 0 days.

(21) Appl. No.: 15/951,322

(22) Filed: Apr. 12, 2018

(65) Prior Publication Data
US 2019/0316634 A1   Oct. 17, 2019

(51) Int. Cl.
*F16C 33/78*   (2006.01)
*F16C 19/06*   (2006.01)

(52) U.S. Cl.
CPC .......... *F16C 33/7866* (2013.01); *F16C 19/06* (2013.01); *F16C 33/7863* (2013.01)

(58) Field of Classification Search
CPC .................................................. F16C 33/782; F16C 33/7823; F16C 33/7826; F16C 33/7859; F16C 33/7863; F16C 33/7866; F16C 33/7879; F16C 33/7883; F16J 15/3204; F16J 15/3224; F16J 15/3232; F16J 15/3236
See application file for complete search history.

(56) References Cited

U.S. PATENT DOCUMENTS 4,669,895 A * 6/1987 Colanzi ............... F16C 33/7879
                                                                 384/477
6,817,769 B2 * 11/2004 Johnson ................ F16C 23/084
                                                                 384/478

FOREIGN PATENT DOCUMENTS

WO   WO2010069703   *   6/2010

* cited by examiner

*Primary Examiner* — James Pilkington
(74) *Attorney, Agent, or Firm* — Antun M. Peakovic

(57) ABSTRACT

A bearing assembly may include first and second rings and a seal assembly therebetween. A stiff element may be coupled to a radial surface of the first ring and a flinger coupled to a radial surface of the second ring. The flinger may include an axially extending portion that contacts the radial surface of the second ring and a radially extending portion. The radially extending portion may be curved in a radial direction, having portions that extend axially inward and outward. A flexible element may be attached to the stiff element and include an axial lip that is configured to seal with the radially extending portion of the flinger. The flinger may be configured such that a misalignment between the flinger and the stiff element, compared to a neutral position, results in a substantially similar interference area between the axial lip and the radially extending portion of the flinger.

17 Claims, 8 Drawing Sheets

COMPENSATING BEARING SEALS

TECHNICAL FIELD

The present disclosure relates generally to bearing seals, and more specifically to bearing seals that can compensate for misalignments.

BACKGROUND

Bearing assemblies generally include a plurality of rolling elements sandwiched between opposing raceways in bearing rings. The rolling elements may take many forms, such as spherical balls, rollers, tapered rollers, barrel-shaped spherical rollers, or others. Bearing assemblies are used in a wide range of applications, including in vehicles. In order to prevent or reduce ingress of contaminants or egress of lubricants, the bearing assembly may include one or more seals.

SUMMARY

In at least one embodiment, a bearing assembly is provided. The bearing assembly may include an inner ring, an outer ring, and a seal assembly disposed between the inner and the outer ring. The seal assembly may include a stiff element coupled to an inner radial surface of the outer ring and a flinger coupled to an outer radial surface of the inner ring. The flinger may include an axially extending portion that contacts the outer radial surface and a radially extending portion. A flexible element may be attached to the stiff element and include an axial lip that is configured to contact and form a seal with the radially extending portion of the flinger. The flinger may be configured such that a misalignment between the flinger and the stiff element, compared to a neutral position, results in a substantially constant interference area between the axial lip and the radially extending portion of the flinger as in the neutral position.

In one embodiment, the radially extending portion is curved in a radial direction, having a portion that extends axially inward and a portion that extends axially outward. The radially extending portion may have a serpentine shape in the radial direction. In one embodiment, the radially extending portion includes a concave section and a convex section in the radial direction, and a transition section therebetween. The axial lip of the flexible element may be configured to contact the radially extending portion proximate the transition section. In another embodiment, the flinger is configured such that a tilt range of ±0.5 degrees from the neutral position between the flinger and the stiff element results in a change in the interference area of at most 30% compared to the neutral position. In another embodiment, the flinger is configured such that a tilt range of ±0.5 degrees from the neutral position between the flinger and the stiff element results in a change in the interference area of at most 0.02 mm$^2$ compared to the neutral position.

In one embodiment, the flexible element further includes a radial lip that is configured to contact and form a seal with the outer radial surface of the inner ring. The outer radial surface of the inner ring may be configured such that a misalignment between the inner ring and the stiff element, compared to a neutral position, results in a substantially constant interference area between the radial lip and the outer radial surface of the inner ring as in the neutral position. The radial lip may be configured to contact a sloped section of the outer radial surface of the inner ring, wherein the sloped section extends radially inward as it extends axially outward. The outer radial surface of the inner ring may be configured such that a tilt range of ±0.5 degrees from the neutral position between the inner ring and the stiff element results in a change in the interference area of at most 30% compared to the neutral position.

In at least one embodiment, a bearing assembly is provided. The bearing assembly may include a first ring, a second ring, and a seal assembly disposed between the first and the second ring. The seal assembly may include a stiff element coupled to a radial surface of the first ring and a flinger coupled to a radial surface of the second ring. The flinger may include an axially extending portion that contacts the radial surface of the second ring and a radially extending portion. The radially extending portion may be curved in a radial direction, having a portion that extends axially inward and a portion that extends axially outward. A flexible element may be attached to the stiff element and include an axial lip that is configured to contact and form a seal with the radially extending portion of the flinger. The flinger may be configured such that a misalignment between the flinger and the stiff element, compared to a neutral position, results in a substantially similar interference area between the axial lip and the radially extending portion of the flinger as in the neutral position.

In one embodiment, the radially extending portion has a serpentine shape in the radial direction. The radially extending portion may include a concave section and a convex section in the radial direction, and a transition section therebetween. The axial lip of the flexible element may be configured to contact the radially extending portion proximate the transition section. In one embodiment, the flinger is configured such that a tilt range of ±0.5 degrees from the neutral position between the flinger and the stiff element results in a change in the interference area of at most 30% compared to the neutral position. In another embodiment, the flinger is configured such that a tilt range of ±0.5 degrees from the neutral position between the flinger and the stiff element results in a change in the interference area of at most 0.02 mm$^2$ compared to the neutral position.

In one embodiment, the flexible element further includes a radial lip that is configured to contact and form a seal with the radial surface of the second ring. The radial surface of the second ring may be configured such that a misalignment between the second ring and the stiff element, compared to a neutral position, results in a substantially constant interference area between the radial lip and the radial surface of the second ring as in the neutral position. The radial lip may be configured to contact a sloped section of the radial surface of the second ring, the sloped section having a changing diameter as it extends axially outward. In one embodiment, the radial surface of the second ring is configured such that a tilt range of ±0.5 degrees from the neutral position between the second ring and the stiff element results in a change in the interference area of at most 30% compared to the neutral position.

DETAILED DESCRIPTION

Embodiments of the present disclosure are described herein. It should be appreciated that like drawing numbers appearing in different drawing views identify identical, or functionally similar, structural elements. Also, it is to be understood that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the embodiments. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

The terminology used herein is for the purpose of describing particular aspects only, and is not intended to limit the scope of the present disclosure. Unless defined otherwise, all technical and scientific terms used herein have the same meaning as commonly understood to one of ordinary skill in the art to which this disclosure belongs. Although any methods, devices or materials similar or equivalent to those described herein can be used in the practice or testing of the disclosure, the following example methods, devices, and materials are now described.

Figure 1:
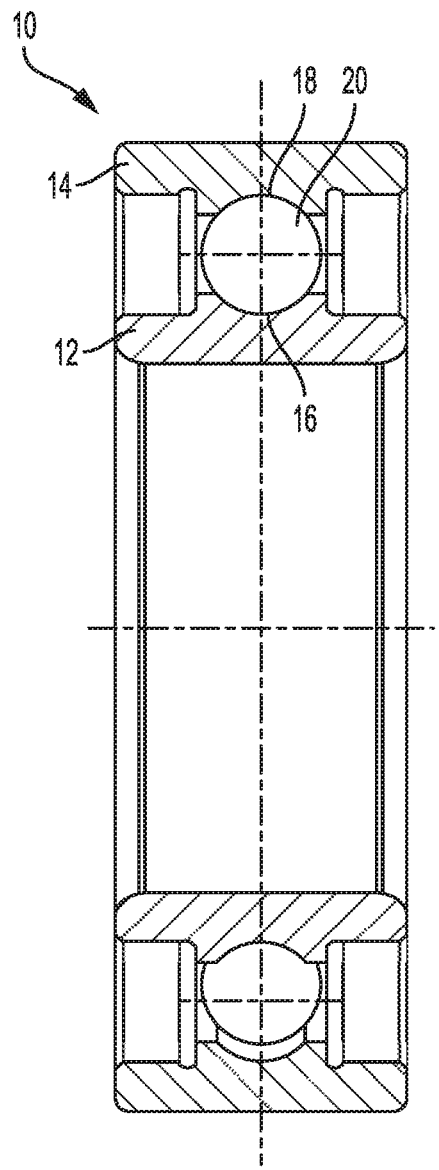
FIG. 1 is a cross-section of a bearing assembly, according to an embodiment.
Figure 2:
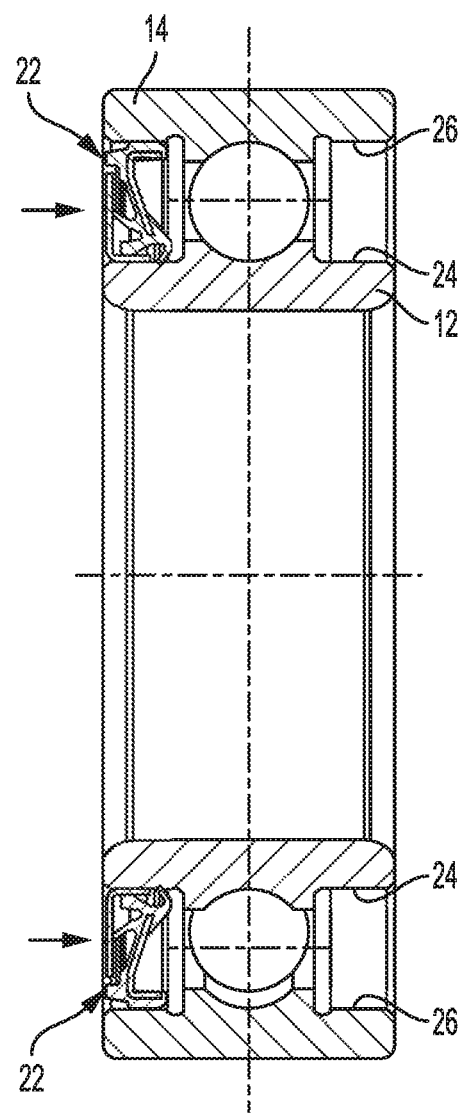
FIG. 2 is a cross-section of a bearing assembly with a seal inserted, according to an embodiment.

With reference to FIGS. 1 and 2, a bearing assembly 10 is shown. The bearing assembly 10 may include an inner bearing ring 12 and an outer bearing ring 14. The inner bearing ring 12 may define an inner race 16 and the outer bearing ring 14 may define an outer race 18. One or more (e.g., a plurality) of rolling elements 20 may be disposed and/or supported between the inner race 16 and the outer race 18 when the bearing assembly 10 is assembled. In the embodiment shown, the rolling elements 20 are spherical (e.g., ball bearings). However, any suitable type of rolling element may be used, such as roller bearings or others. Non-limiting examples of rolling elements may include cylindrical, cone-shaped/tapered, barrel shaped, or others.

With reference to FIG. 2, to prevent or reduce the ingress of contaminants (e.g., dirt, water, etc.) into the bearing assembly or the egress of lubricants (e.g., oil, grease, etc.) from within the bearing assembly, a seal 22 may be inserted between the inner bearing ring 12 and the outer bearing ring 14. The seal 22 may be annular in shape and may contact and/or form a seal with an outer radial surface 24 of the inner bearing ring 12 and/or an inner radial surface 26 of the outer bearing ring 14. The particular design or shape of the seal 22 may vary depending on the bearing assembly. In general, the seal 22 may include one or more metal portions, which may provide stiffness or rigidity, and one or more flexible portions, which may conform to the surface with which it is in contact to form a seal. The flexible portions may be formed of a polymer material, such as an elastomer (e.g., rubber).

Figure 3:
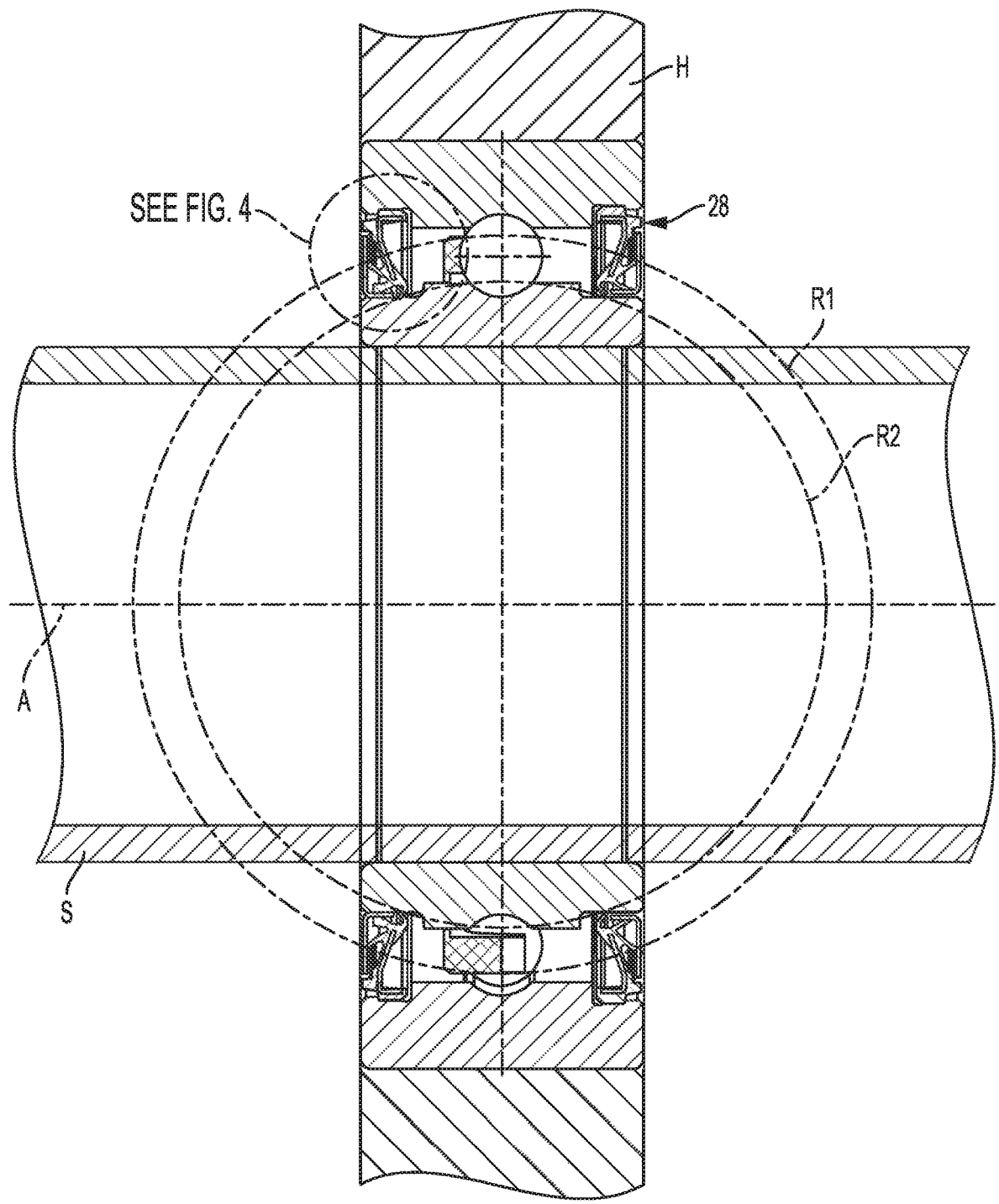
FIG. 3 is a cross-section of a bearing assembly secured to a shaft and a housing, according to an embodiment.

With reference to FIGS. 2 and 3, the seal assembly 22 may be pressed into the opening between the inner and outer bearing rings 12 and 14. An interference fit may therefore be formed between one or more portions of the seal assembly 22 and the outer radial surface 24 of the inner bearing ring 12 and/or an inner radial surface 26 of the outer bearing ring 14. A second seal assembly 28 may be inserted into the other side (right side, as shown) of the bearing assembly. The second seal assembly 28 may be substantially the same as the seal assembly 22 on the left side, but may be mirrored along the vertical axis (as shown). As shown in FIG. 3, there may be a first alignment radius R1 and a second alignment radius R2. The alignment radii may also be referred to as misalignment radii. As described in more detail, below, the radius R1 may correspond to an axial seal lip contact location and the radius R2 may correspond to a radial lip contact location. In one embodiment, an example of which is shown in FIG. 3, the inner bearing ring 12 may be secured or attached to a shaft S (e.g., by interference fit) and the outer ring 14 may be secured or attached to a housing H (e.g., by interference fit). Typically, one of the shaft S and the housing H may rotate while the other is fixed. However, in certain applications, both may rotate. While a shaft and housing are shown in the Figures, one of ordinary skill will understand that the bearing rings may be secured or attached to other components.

Figure 4:
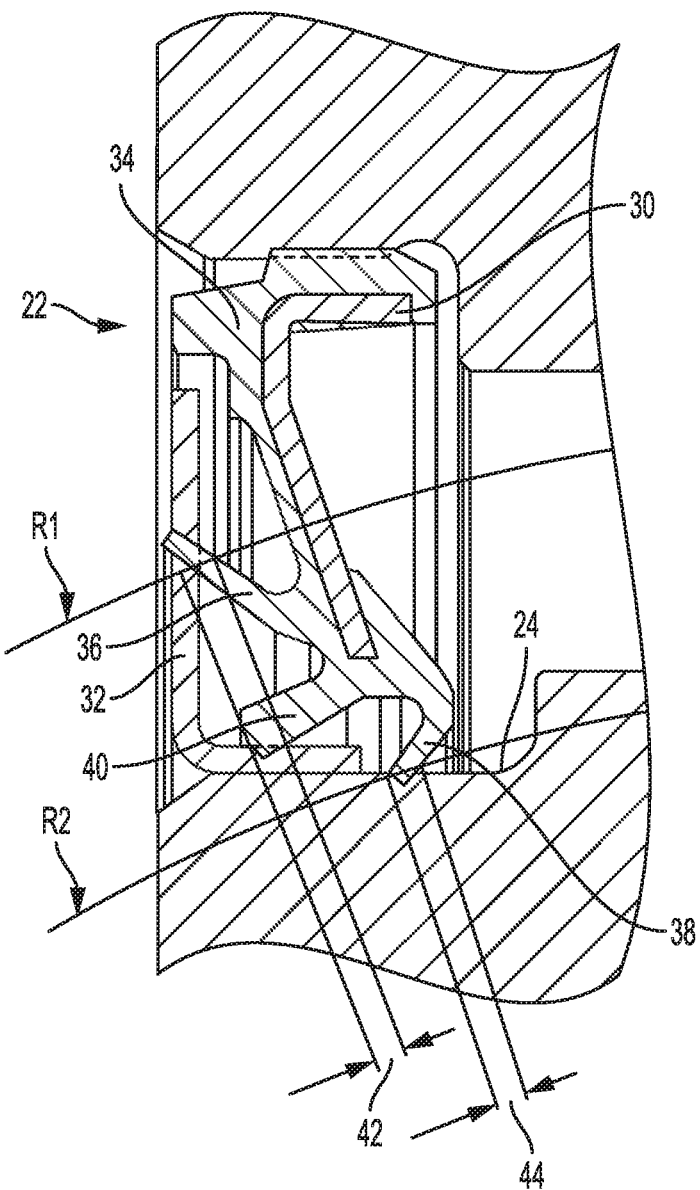
FIG. 4 is a cross-section of a seal assembly, according to an embodiment.

With reference to FIG. 4, an enlarged view of the first seal assembly 22 is shown. In the embodiment shown, the seal assembly includes a first stiff element 30 (e.g., formed of metal, such as steel) that is coupled or attached to the inner radial surface 26 of the outer bearing ring 14. For example, the first stiff element 30 may be interference or press-fit into the outer bearing ring 14. A second stiff element 32 (e.g., formed of metal, such as steel) may be coupled or attached to the outer radial surface 24 of the inner bearing ring 12. For example, the second stiff element 32 may be interference or press-fit into the inner bearing ring 12. The second stiff element 32 may be referred to as a flinger. The seal 22 may include one or more flexible elements 34, which may be attached to the first and/or second stiff element 30, 32, for example, by over-molding. In the embodiment shown, a flexible element 34 is attached to the first stiff element 30 and portions of the flexible element 34 sealingly engage the second stiff element 32 and the outer radial surface 24 of the inner bearing ring 12.

While the flexible element 34 is shown as attached to the first stiff element 30, it may be alternatively attached to the second stiff element 32 or there may be multiple flexible elements 34 attached to one or both of the stiff elements. In addition, the shape of the flexible element 34 shown is merely an example, and other designs or shapes may be used.

The flexible element 34 may include one or more lips that are configured to engage an opposing surface to create a seal. In the embodiment shown, the flexible element 34 includes three lips, however, there may be fewer or a greater number of lips (e.g., 1, 2, 4, 5, or more). In one embodiment, there may be an axial lip 36 that is configured to contact and form a seal with the flinger 32 in an axial direction. The axial lip 36 need not extend only in the axial direction, but may form a seal between the lip and the flinger such that water or other contaminants do not easily move past the seal in a radial direction.

There may also (or alternatively) be a first radial lip 38 that is configured to contact and form a seal with the inner ring 12, such as with the outer radial surface 24 of the inner bearing ring 12, which may be the same surface to which the flinger 32 is attached or secured (e.g., by interference fit). Similar to the axial lip 36, the first radial lip 38 need not extend only in the radial direction, but may form a seal between the lip and the inner ring such that water or other contaminants do not easily move past the seal in the axial direction. In some embodiments, such as the one shown, there may be a second radial lip 40. The second radial lip 40 may be configured to contact and form a seal with an axially extending portion of the flinger 32. Similar to the first radial lip 38, the second radial lip 40 need not extend only in the radial direction, but may form a seal between the lip and the flinger such that water or other contaminants do not easily move past the seal in the axial direction. One of ordinary skill in the art will understand, in view of the present disclosure, that other numbers and/or configurations of sealing lips may be used. For example, there may be two or more axial lips instead of the one that is shown, or they may be a single radial lip, three or more radial lips, or no radial lip.

The first and second alignment radii R1 and R2 are shown in more detail in FIG. 4. As shown, the first radius R1 may refer to the potential contact points of the axial lip 36 with the flinger 32 (e.g., a radially extending portion of the flinger). Similarly, the second radius R2 may refer to the potential contact points of the first radial lip 38 with the surface 24 of the inner ring 12 (e.g., an axially oriented surface). Depending on where the lips contact their respective opposing surfaces, there may be some misalignment compared to the predetermined or intended contact point. For example, if the flinger 32 is rotated clockwise (negative rotation, as used herein) relative to the first stiff element 30 and the flexible element 34, then the axial lip 36 may contact the flinger 32 at a radially lower point. If the flinger 32 is rotated counter-clockwise (positive rotation, as used herein) relative to the first stiff element 30 and the flexible element 34, then the axial lip 36 may contact the flinger 32 at a radially higher point. A similar shift in contact point (although not necessarily in the same direction) may occur between the first radial lip 38 and the surface 24 of the inner ring 12 when there is a misalignment.

In one embodiment, the misalignment between the axial lip 36 and the flinger 32 may be describe as the degree of misalignment 42 of the axial lip and the misalignment between the first radial lip 38 and the surface 24 may be describe as the degree of misalignment 44 of the first radial lip. As shown in FIGS. 3 and 4, the degrees of misalignment 42 and 44 may be based on a radial arc from a center axis A and may be expressed in degrees. The misalignments may be caused by issues like part tolerances, clearances, moments from off-center loading, or combinations thereof.

In one non-limiting example, the misalignments may result from a tilting of the shaft S relative to the housing H. In this example, the inner ring 12 may be fixed to the shaft and may be the moving component, while the outer ring 14 is fixed in the housing H and is the stationary component. Due to one, or a combination, of the issues above, the shaft may be at a tilt relative to the housing. This may cause a relative tilt between the flinger 32 (attached indirectly to shaft S) and the flexible element 34 (attached indirectly to the housing H). This tilt may cause the misalignments, compared to a zero-degree tilt, of the axial lip and the first radial lip. One of ordinary skill in the art, based on the present disclosure, will understand that such a tilt may occur due to a variety of reasons and the example given is not intended to be limiting.

Figure 5C:
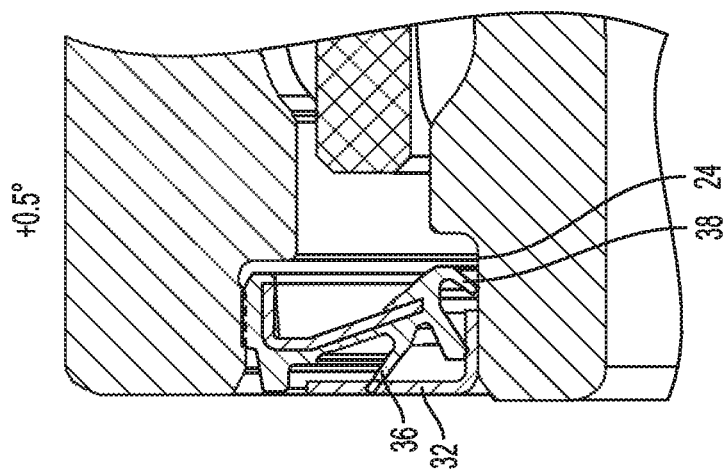
FIGS. 5A, 5B, and 5C are cross-sections of a seal assembly at different levels of misalignment, according to an embodiment.
Figure 5B:
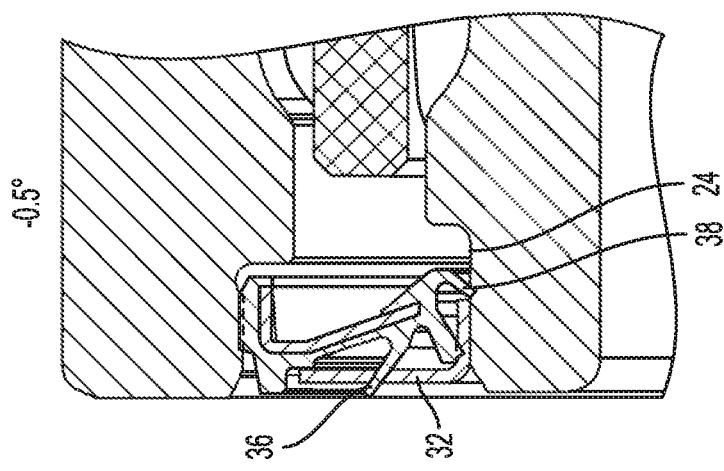
Figure 5A:
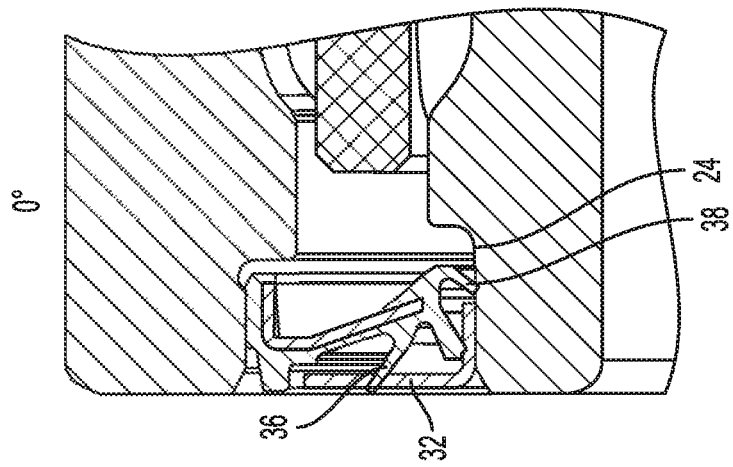

With reference to FIGS. 5A-5C, the impact of the tilt is shown on a bearing having the configuration shown in FIGS. 1-4. FIG. 5A shows the relative positioning of the surface 24, flinger 32, the axial lip 36, and the first radial lip 38 with a zero-degree tilt (e.g., no misalignment). This may represent the configuration as-designed or as-intended. As shown, the axial lip 36 is contacting the radial portion of the flinger 32 and the first radial lip 38 is contacting the axially oriented surface 24 of inner ring 12. It should be noticed that while the axial lip 36 and the first radial lip 38 are shown as extending into and/or through their respective opposing surfaces, this is merely a schematic illustration. In reality, the lips would contact the opposing surfaces and bend or flex. For modeling purposes, however, it is simpler to show the lip extending through the opposing surface rather than calculate the exact shape it would take when bending/flexing.

In FIG. 5B, the same bearing assembly is shown, but with a −0.5 degree tilt (clockwise) of the inner ring (and therefore flinger 32) relative to the outer ring (and therefore flexible element 34). Due to the tilt, the radial portion of the flinger 32 is moved axially closer to the flexible element 34. Therefore, the axial lip 36 makes greater contact with the flinger 32, as depicted by the axial lip 36 extending farther through the flinger 32. In reality, this would result in a larger flex of the axial lip 36, resulting in a larger contact area and/or or larger contact force. Similarly, the surface 24 of the inner ring 12 is rotated radially upward and closer to the flexible element 34. Therefore, the first radial lip 38 makes greater contact with the surface 24, as depicted by the first radial lip 38 extending farther through the surface 24. Again, in reality, this would result in a larger flex of the first radial lip 38, resulting in a larger contact area and/or or larger contact force.

In FIG. 5C, the same bearing assembly is shown, but with a +0.5 degree tilt (counter-clockwise) of the inner ring (and therefore flinger 32) relative to the outer ring (and therefore flexible element 34). Due to the tilt, the radial portion of the flinger 32 is moved axially farther from the flexible element 34. Therefore, the axial lip 36 makes reduced contact with the flinger 32, as depicted by the axial lip 36 not extending as far into/through the flinger 32. In reality, this would result in a reduced flex of the axial lip 36, resulting in a smaller contact area and/or or smaller contact force. Similarly, the surface 24 of the inner ring 12 is rotated radially downward and away from the flexible element 34. Therefore, the first radial lip 38 makes reduced contact with the surface 24, as depicted by the first radial lip 38 not extending as far into/through the surface 24. Again, in reality, this would result in a reduced flex of the first radial lip 38, resulting in a smaller contact area and/or or smaller contact force.

In certain circumstances, the positioning shown in FIGS. 5B and 5C may be occurring at the same time in opposing seal assemblies. For example, with reference to FIG. 3, if there is a positive rotation (e.g., of +0.5 degrees) in the seal assembly 22 at the top of the figure, then the seal 28 in the directly opposite location may have an opposite rotation (e.g., of −0.5 degrees). The contact area/force of the sealing lips may affect the sealing performance and the overall bearing performance of the bearing assembly. If the contact area/force is too great, then friction is increased between the rotating components, which may generate heat and reduce overall performance. Conversely, too little contact area/force may provide a weaker seal and may be more likely to allow contaminants to penetrate the seal (or lubricant to escape). Accordingly, a misaligned seal may result in portions of the seal having too great a contact area and other portions having too small a contact area—which may reduce both bearing performance and sealing performance.

With reference to FIGS. 6A-9C, examples embodiments are shown of bearing seals that can compensate for misalignments within the seal (e.g., as a result of tilting between the rings). The disclosed seals may be shaped or configured such that misalignments in the seal still result in a substantially same contact area and/or force between the lips of the flexible element and the opposing surface (e.g., flinger or inner ring surface). In one embodiment, this may be accomplished, at least in part, due to a radial portion of the flinger having a curved shape in cross-section. Stated another way, the radial portion of the flinger may not extend straight in the radial direction (e.g., the direction perpendicular to the bearing axis), like the flinger 32 shown in FIGS. 4 and 5A-5C. In another embodiment, the contact area/force may be maintained, at least in part, due to a change in shape of the outer surface of the inner ring (e.g., surface 24 in FIGS. 2-5C. Instead of being straight and extending only in the axial direction, the surface may be curved or sloped. Example embodiments of such bearing seals are described below, where elements having the same general configuration are identified with the same numbers as FIGS. 1-5C.

Figure 6C:
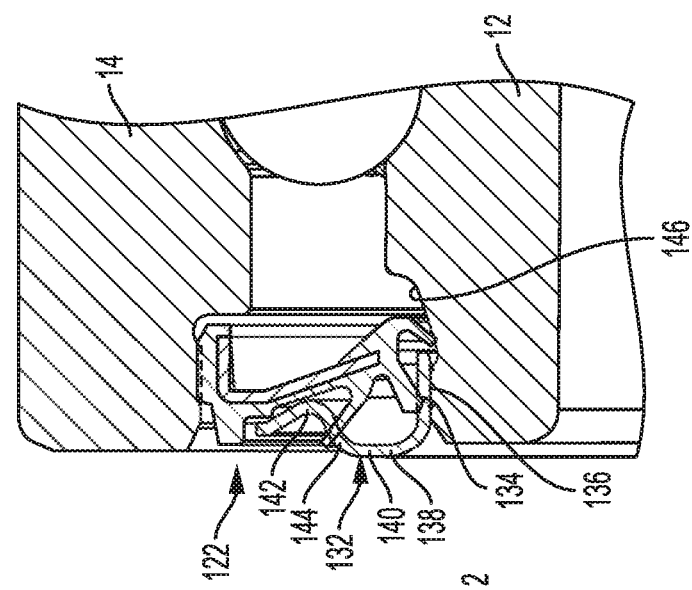
FIGS. 6A, 6B, and 6C are cross-sections of a disclosed seal assembly at different levels of misalignment, according to an embodiment.
Figure 6B:
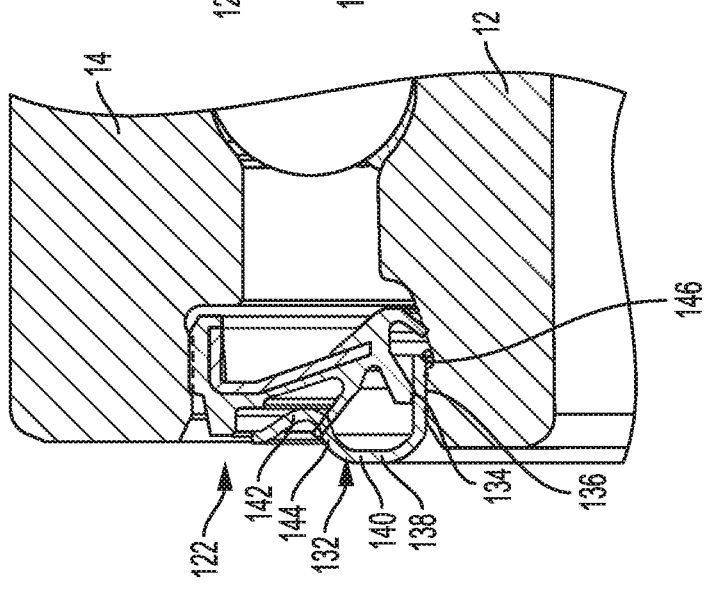
Figure 6A:
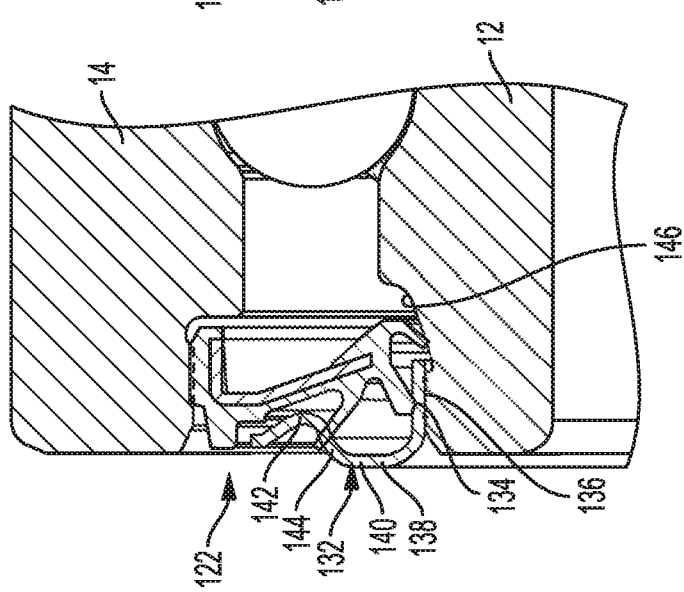

With reference to FIGS. 6A-6C, a seal assembly 122 is shown having a first stiff element 30 and a flinger 132. A flexible element 34 may be attached or secured to the first stiff element 30, as described above, and may include an axial lip 36, a first radial lip 38, and a second radial lip 40. The flinger 132 may include an axial portion 134 which may be configured to contact an axially extending portion 136 of the surface 24, for example, forming an interference fit. The flinger 132 may also include a radial portion 138. As described above, the radial portion 138 may extend generally in the radial direction, but may not extend straight in the radial direction. The radial portion 138 may be curved, having one or more portions that extend axially inward and one or more portions that extend axially outward. Stated another way, the radial portion 138 may have a serpentine shape or a reverse/inverted S-shape.

In one embodiment, the radial portion 138 may include a section 140 that is concave relative to the axial lip 36 and another section 142 that is convex. A section 144 may form a transition between sections 140 and 142. In one embodiment, the seal 122 may be configured such that the axial lip 36 contacts the flinger 132 proximate the transition section 144. However, such positioning is not required, and may vary depending on the seal design. In one embodiment, the concave section 140 may extend axially beyond the axial end faces of the inner and/or outer rings. However, in other embodiments, the seal 122 may be shifted axially inward such that the flinger 132 does not extend axially outward past the bearing rings.

With reference to FIG. 6A, the seal 122 is shown with a zero-degree tilt, similar to the positioning shown in FIG. 5A, described in more detail above. Similarly, FIGS. 6B and 6C correspond to tilts of −0.5 and +0.5 degrees, respectively, similar to FIGS. 5B and 5C described above. However, as shown in FIGS. 6A-6C, the axial lip 36 maintains a substantially constant position relative to the flinger 132. This is evidenced by the axial lip 36 extending into/through the flinger 132 by an almost identical amount (schematically). As described above, in reality, this corresponds to a very similar contact area/force between the axial lip 36 and the flinger 132. The maintaining of the contact area/force may be a result of the changed flinger geometry, for example, the curved/serpentine shape and/or the location of the contact between the axial lip 36 and the flinger 132. However, the flinger shape shown in FIGS. 6A-6C are merely an example, and one of ordinary skill in the art will understand, based on the present disclosure, that other flinger designs may also result in the substantially constant contact area/force.

In addition to the changed flinger geometry, the seal assembly 122 shown in FIGS. 6A-6C also includes a change to the surface 24 of the inner ring 12. As described above, the surface 24 may include an axially extending portion 136 that is configured to receive the axial portion 134 of the flinger 132. The surface 24 may also include a sloped portion 146 that is configured to receive/contact the first radial lip 38. The sloped portion 146 may be axially inside of the axially extending portion 136. The sloped portion 146 may decrease in diameter in a direction from axially inward to axially outward, as shown. Stated another way, the first radial lip 38 may contact the sloped portion 146 on a downward slope. The slope may be straight/linear or it may be curved.

Similar to the effect on axial lip 36, the sloped portion 146 may cause the contact area/force of the first radial lip 38 therewith to be substantially constant despite tilting in either direction (e.g., ±0.5 degrees). This is evidenced by the first radial lip 38 extending into/through the sloped portion 146 by an almost identical amount (schematically). As described above, in reality, this corresponds to a very similar contact area/force between the first radial lip 38 and the sloped portion 146. The maintaining of the contact area/force may be a result of the changed inner ring geometry, for example, the inwardly sloping surface. However, the sloped portion 146 shown in FIGS. 6A-6C is merely an example, and one of ordinary skill in the art will understand, based on the present disclosure, that other inner ring designs may also result in the substantially constant contact area/force.

Figure 7C:
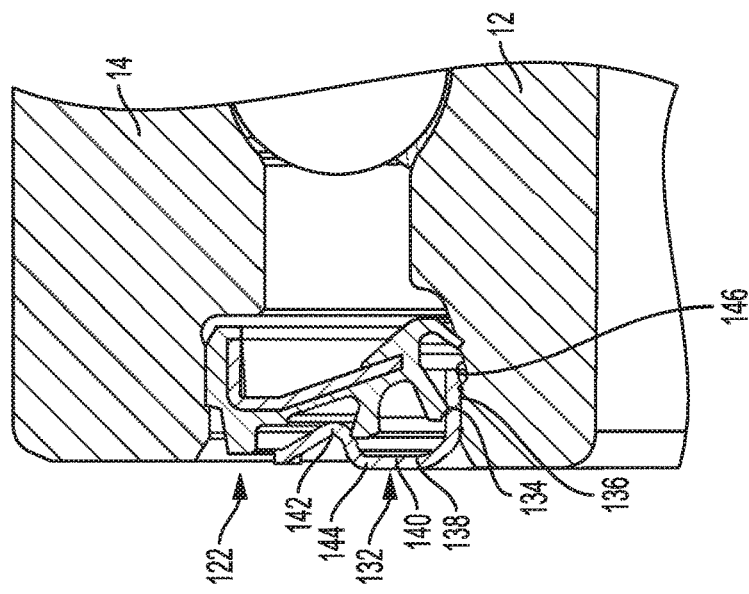
FIGS. 7A, 7B, and 7C are cross-sections of a disclosed seal assembly at different levels of misalignment, according to an embodiment.
Figure 7B:
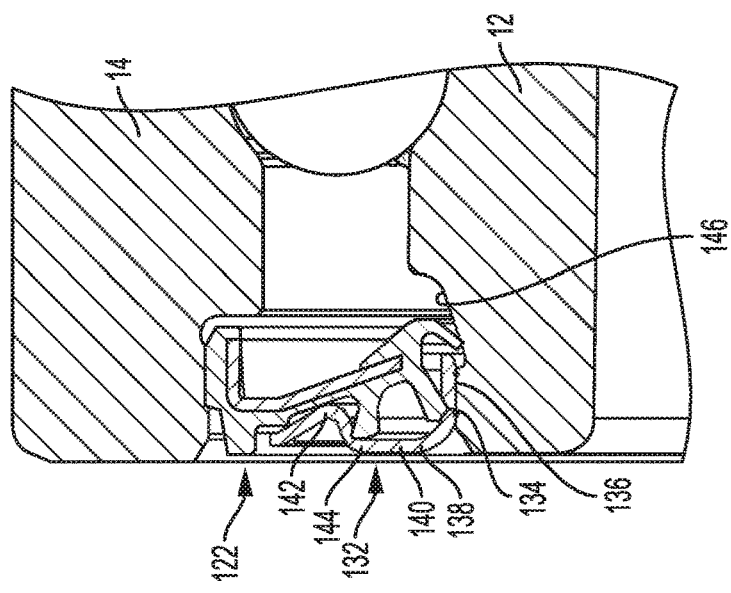
Figure 7A:
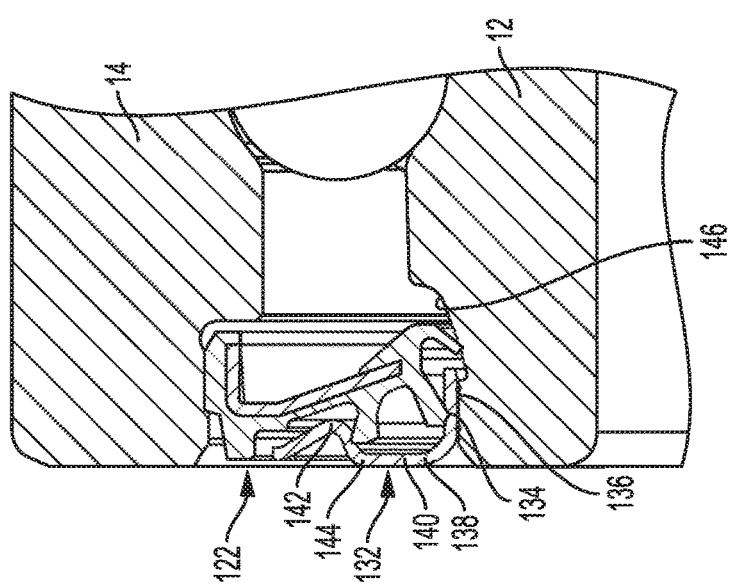

With reference to FIGS. 7A-7C, another embodiment of the seal assembly 122 is shown. The elements are numbered the same as FIGS. 6A-6C, but there are some geometry/shape changes of the components. For example, the axial lip 36 in FIGS. 6A-6C was elongated with a relatively high length to thickness ratio, while the axial lip 36 in FIGS. 7A-7C is shorter and thicker. In addition, the flinger 132 has a slightly different shape. For example, the transition section 144 between the concave section 140 and the convex section 142 may be sharper than the transition section in FIGS. 6A-6C. Also, the flinger 132 in FIGS. 7A-7C does not extend axially beyond the inner and outer bearing rings. However, the seal assembly in FIGS. 7A-7C works the same as that in 6A-6C, with the tilting of the rings relative to each other not resulting in a significant change in the contact area/force between the axial lip 36 and flinger 132 and/or the first radial lip 38 and the sloped portion 146. The two embodiments are shown to illustrate that the design of the seal assembly may be varied while maintaining the consistent contact area/force described herein.

Figure 8C:
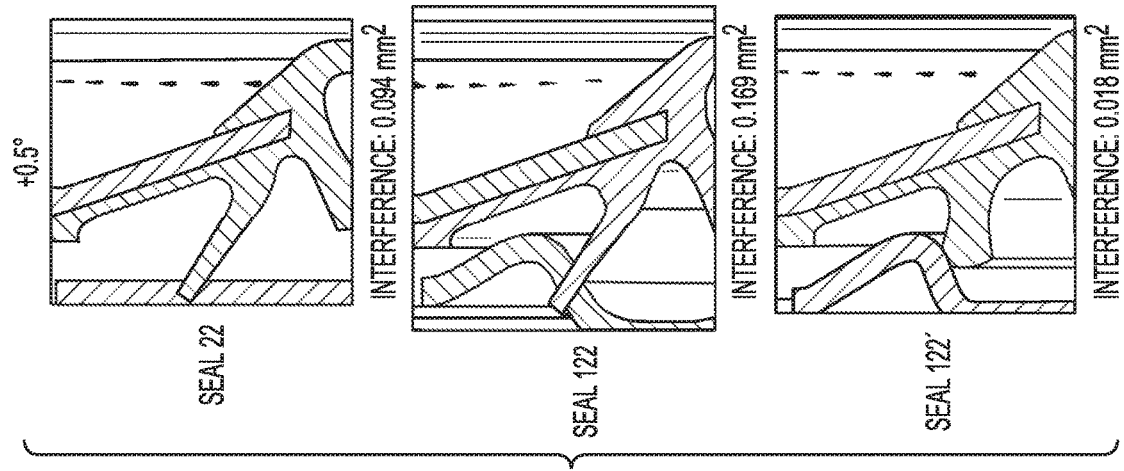
FIGS. 8A, 8B, and 8C are cross-sections of multiple axial seal lips compared at different levels of misalignment.
Figure 8B:
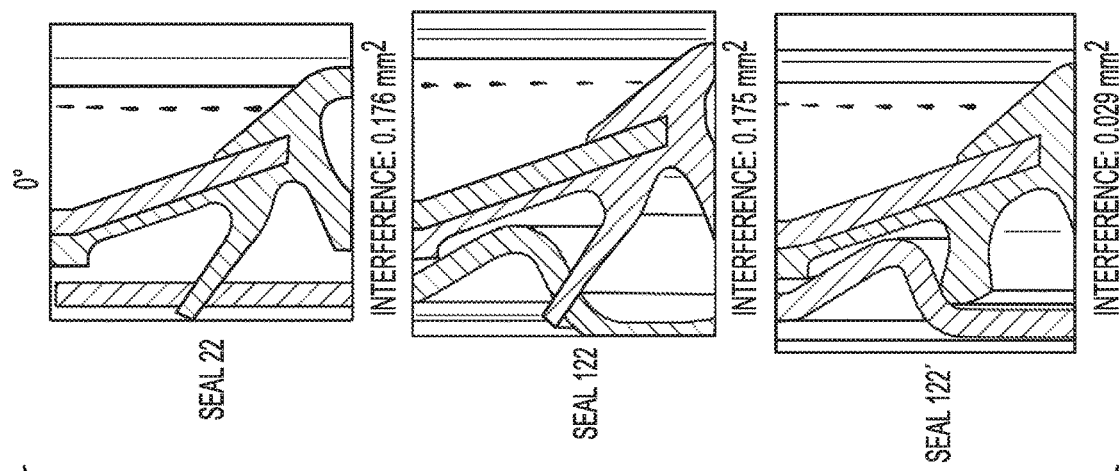
Figure 8A:
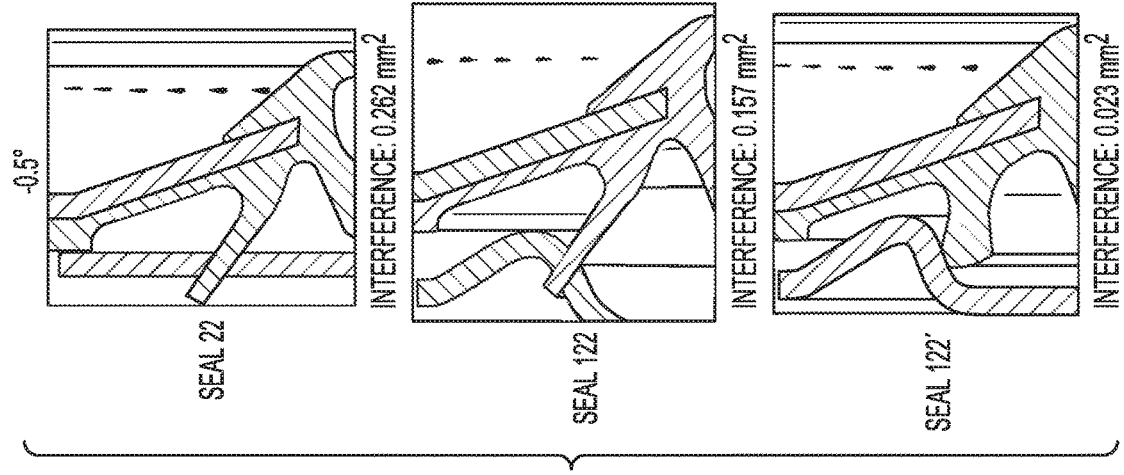

With reference to FIGS. 8A-8C, the axial lip seal designs of FIGS. 6A-7C are compared to that of FIGS. 5A-5C. The seal of FIGS. 6A-6C are referred to as seal 122 and the seal of FIGS. 7A-7C are referred to as seal 122'. FIG. 8A compares the designs at −0.5 degrees, FIG. 8B compares them at 0 degrees (e.g., no tilt or "neutral"), and FIG. 8C compares them at +0.5 degrees. Below each design is the interference or contact area, expressed as mm². In FIG. 8B, at zero tilt, seal 22 and seal 122 have almost identical interference, while seal 122' has a lower interference. The level of interference may be a function of the seal operating parameters and the seal properties. The axial lip in seal 122' is shorter and thicker than those of seal 22/122, and may therefore be less flexible, which may require a lower interference.

FIG. 8A shows each seal when there is a −0.5 degree tilt. As indicated under each seal design, the interference for seal 22 increased significantly, while the interferences for seals 122 and 122' varied only slightly. Similarly, FIG. 8C shows each seal when there is a +0.5 degree tilt. As indicated under each seal design, the interference for seal 22 decreased significantly, while the interferences for seals 122 and 122' were much less changed. The tables below show a summary of the changes in interference.

TABLE 1

Axial Lip Interference (mm²)

| Tilt | −0.5° | 0° | +0.5° |
|---|---|---|---|
| Seal 22 | 0.262 | 0.176 | 0.094 |
| Seal 122 | 0.157 | 0.175 | 0.169 |
| Seal 122' | 0.023 | 0.029 | 0.018 |

TABLE 2

Difference from 0° (mm²)

| Tilt | −0.5° | 0° | +0.5° |
|---|---|---|---|
| Seal 22 | 0.086 | — | −0.082 |
| Seal 122 | −0.018 | — | −0.006 |
| Seal 122' | −0.005 | — | −0.011 |

TABLE 3

Percent Difference from 0° (difference/0°)

| Tilt | −0.5° | 0° | +0.5° |
|---|---|---|---|
| Seal 22 | 48.9 | — | −46.6 |
| Seal 122 | −10.3 | — | −3.4 |
| Seal 122' | −17.2 | — | −37.9 |

Accordingly, as shown by the data, the seals 122/122' each had lower absolute and percentage differences for both the negative tilt and the positive tilt.

Figure 9C:
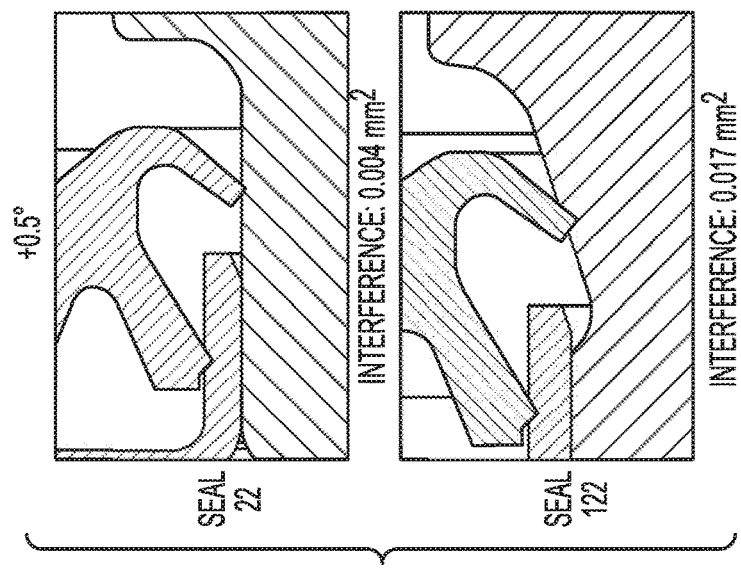
FIGS. 9A, 9B, and 9C are cross-sections of multiple radial seal lips compared at different levels of misalignment.
Figure 9B:
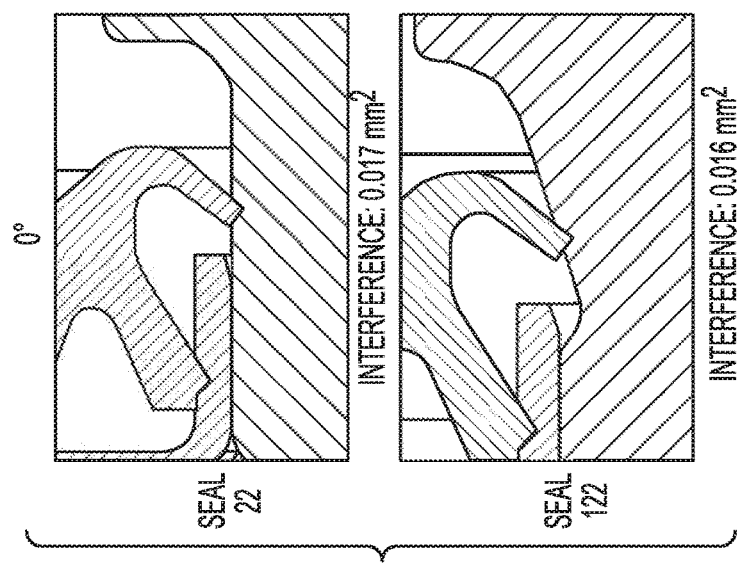
Figure 9A:
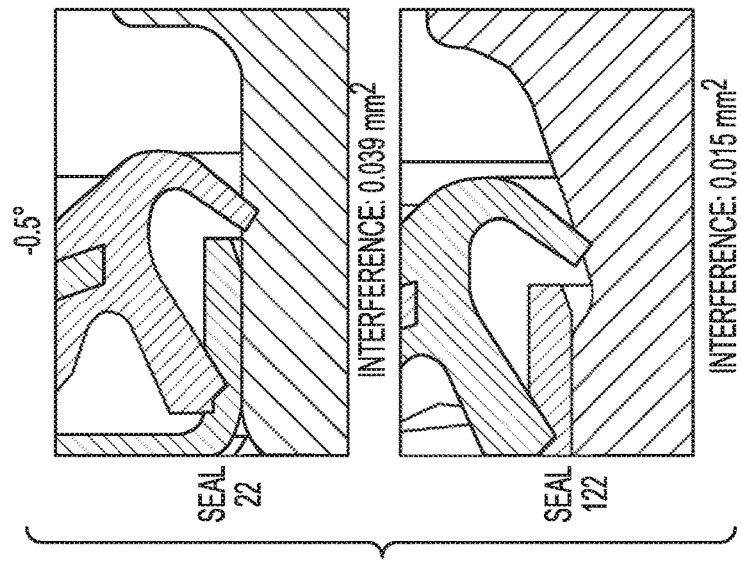

With reference to FIGS. 9A-9C, the first radial lip seal designs of FIGS. 6A-7C are compared to that of FIGS. 5A-5C. The seal of FIGS. 6A-7C are referred to as seal 122. FIG. 9A compares the designs at −0.5 degrees, FIG. 9B compares them at 0 degrees (e.g., no tilt or "neutral"), and FIG. 9C compares them at +0.5 degrees. Below each design is the interference or contact area, expressed as mm². In FIG. 9B, at zero tilt, seal 22 and seal 122 have almost identical interference. The level of interference may be a function of the seal operating parameters and the seal properties.

FIG. 9A shows each seal when there is a −0.5 degree tilt. As indicated under each seal design, the interference for seal 22 increased significantly, while the interference for seal 122 varied only slightly. Similarly, FIG. 9C shows each seal when there is a +0.5 degree tilt. As indicated under each seal design, the interference for seal 22 decreased significantly, while the interferences for seal 122 was much less changed. The tables below show a summary of the changes in interference.

TABLE 4

First Radial Lip Interference (mm²)

| Tilt | −0.5° | 0° | +0.5° |
|---|---|---|---|
| Seal 22 | 0.039 | 0.017 | 0.004 |
| Seal 122 | 0.015 | 0.016 | 0.017 |

TABLE 5

Difference from 0° (mm²)

| Tilt | −0.5° | 0° | +0.5° |
|---|---|---|---|
| Seal 22 | 0.022 | — | −0.013 |
| Seal 122 | −0.001 | — | 0.001 |

TABLE 6

Percent Difference from 0° (difference/0°)

| Tilt | −0.5° | 0° | +0.5° |
|---|---|---|---|
| Seal 22 | 129.4 | — | −76.5 |
| Seal 122 | −6.3 | — | 6.3 |

Accordingly, as shown by the data, the seal 122 had significantly lower absolute and percentage differences for both the negative tilt and the positive tilt.

In at least one embodiment, the disclosed seals may reduce the change in interference (e.g., contact area/force) for the axial lip and/or the first radial lip. For example, the change in interference, relative to a 0 degree tilt, may be at most 40%, such as most 30%, 20%, 10%, or 5% (plus or minus). The changes in interference may also be expressed in absolute terms. For example, the change in interference, relative to a 0 degree tilt, may be at most 0.02 mm², such as at most 0.015 mm² or 0.010 mm² (plus or minus). These changes in interference may apply over a certain range of misalignment or tilt. The above examples included a tilt range of ±0.5 degrees, however, the tilt range may be larger or smaller. For example, the tilt range may be at least ±0.2 degrees, such as at least ±0.3 degrees, ±0.4 degrees, or ±0.5 degrees. In another embodiment, the tilt range may be from ±0.1 degrees to ±1.0 degrees, or any sub-range therein, such as ±0.3 degrees to ±1.0 degrees, ±0.3 degrees to ±0.8 degrees, or ±0.5 degrees to ±1.0 degrees. In another embodiment, the tilt range may be about ±0.2 degrees, about ±0.3 degrees, about ±0.4 degrees, about ±0.5 degrees, or about ±0.6 degrees.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the disclosure that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, to the extent any embodiments are described as less desirable than other embodiments or prior art implementations with respect to one or more characteristics, these embodiments are not outside the scope of the disclosure and can be desirable for particular applications.

LIST OF REFERENCE NUMBERS bearing assembly 10
inner bearing ring 12
outer bearing rings 12
outer bearing ring 14
inner race 16
outer race 18
rolling elements 20
first seal assembly 22
outer radial surface 24
inner radial surface 26
second seal assembly 28
first stiff element 30
flinger 32
flexible element 34
axial lip 36
first radial lip 38
second radial lip 40
misalignment 42
misalignment 44
seal assembly 122
flinger 132
axial portion 134
axially extending portion 136
radial portion 138
concave section 140
convex section 142
transition section 144
sloped portion 146

What is claimed is:

1. A bearing assembly, comprising:
an inner ring;
an outer ring;
a seal assembly disposed between the inner and the outer ring, the seal assembly including:
a stiff element coupled to an inner radial surface of the outer ring;
a flinger coupled to an outer radial surface of the inner ring, the flinger including an axially extending portion that contacts the outer radial surface and a radially extending portion; and
a flexible element attached to the stiff element and including an axial lip that is configured to contact and form a seal with the radially extending portion of the flinger;
wherein the radially extending portion of the flinger is sloped at the region of contact with the axial lip to reduce a change in interference area between the axial lip and the flinger due to misalignment between the flinger and the stiff element,
wherein the radially extending portion is cured in a radial direction, having a portion that extends axially inward and a portion that extends axially outward;
wherein the radially extending portion has a serpentine shape in the radial direction.

2. The bearing assembly of claim 1, wherein the radially extending portion includes a concave section and a convex section in the radial direction, and a transition section therebetween.

3. The bearing assembly of claim 2, wherein the axial lip of the flexible element is configured to contact the radially extending portion proximate the transition section.

4. The bearing assembly of claim 1, wherein the flinger is configured such that a tilt range of ±0.5 degrees from the neutral position between the flinger and the stiff element results in a change in the interference area of at most 30% compared to the neutral position.

5. The bearing assembly of claim 1, wherein the flinger is configured such that a tilt range of ±0.5 degrees from the neutral position between the flinger and the stiff element results in a change in the interference area of at most 0.02 mm$^2$ compared to the neutral position.

6. The bearing assembly of claim 1, wherein the flexible element further includes a radial lip that is configured to contact and form a seal with a sloped section of the outer radial surface of the inner ring such that a misalignment between the inner ring and the stiff element, compared to a neutral position, results in a substantially constant interference area between the radial lip and the outer radial surface of the inner ring as in the neutral position.

7. The bearing assembly of claim 6, wherein the sloped section extends radially inward as it extends axially outward.

8. The bearing assembly of claim 6, wherein the outer radial surface of the inner ring is configured such that a tilt range of ±0.5 degrees from the neutral position between the inner ring and the stiff element results in a change in the interference area of at most 30% compared to the neutral position.

9. A bearing assembly, comprising:
a first ring;
a second ring;
a seal assembly disposed between the first and the second ring, the seal assembly including:
a stiff element coupled to a radial surface of the first ring;
a flinger coupled to a radial surface of the second ring, the flinger including an axially extending portion that contacts the radial surface of the second ring and a radially extending portion;
the radially extending portion being curved in a radial direction, having a portion that extends axially inward and a portion that extends axially outward; and
a flexible element attached to the stiff element and including an axial lip that is configured to contact and form a seal with the curve of the radially extending portion of the flinger to reduce a change in interference area between the axial lip and the flinger due to misalignment between the flinger and the stiff element.

10. The bearing assembly of claim 9, wherein the radially extending portion has a serpentine shape in the radial direction.

11. The bearing assembly of claim 10, wherein the radially extending portion includes a concave section and a convex section in the radial direction, and a transition section therebetween.

12. The bearing assembly of claim 11, wherein the axial lip of the flexible element is configured to contact the radially extending portion proximate the transition section.

13. The bearing assembly of claim 9, wherein the flinger is configured such that a tilt range of ±0.5 degrees from the neutral position between the flinger and the stiff element results in a change in the interference area of at most 30% compared to the neutral position.

14. The bearing assembly of claim 9, wherein the flinger is configured such that a tilt range of ±0.5 degrees from the neutral position between the flinger and the stiff element results in a change in the interference area of at most 0.02 mm² compared to the neutral position.

15. The bearing assembly of claim 9, wherein the flexible element further includes a radial lip that is configured to contact and form a seal with a sloped section of the radial surface of the second ring such that a misalignment between the second ring and the stiff element, compared to a neutral position, results in a substantially constant interference area between the radial lip and the radial surface of the second ring as in the neutral position.

16. The bearing assembly of claim 15, wherein the sloped section having a changing diameter as it extends axially outward.

17. The bearing assembly of claim 15, wherein the radial surface of the second ring is configured such that a tilt range of ±0.5 degrees from the neutral position between the second ring and the stiff element results in a change in the interference area of at most 30% compared to the neutral position.

* * * * *